(12) United States Patent
Hackbarth et al.

(10) Patent No.: US 7,816,434 B2
(45) Date of Patent: Oct. 19, 2010

(54) UV-CURING ANTI-FINGERPRINTING COATINGS

(75) Inventors: Karsten Hackbarth, Duesseldorf (DE);
Matthias Koch, Duesseldorf (DE);
Kerstin Motzkat, Oberhausen (DE);
Joerg Sander, Velbert (DE); Holger Endres, Neuss (DE); Wolfgang Schneider, Langenfeld (DE)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 10/796,681

(22) Filed: Mar. 9, 2004

(65) Prior Publication Data

US 2004/0225039 A1 Nov. 11, 2004

Related U.S. Application Data

(63) Continuation of application No. PCT/EP02/09967, filed on Sep. 6, 2002.

(30) Foreign Application Priority Data

Sep. 11, 2001 (DE) ............................. 101 44 531

(51) Int. Cl.
| | |
|---|---|
| *B60C 1/00* | (2006.01) |
| *A61K 6/00* | (2006.01) |
| *C08K 5/00* | (2006.01) |
| *C08F 283/06* | (2006.01) |
| *C08F 283/10* | (2006.01) |

(52) U.S. Cl. .................. 524/261; 524/37; 524/145; 525/404; 522/92

(58) Field of Classification Search .......... 524/261, 524/37, 145; 525/404; 522/92
See application file for complete search history.

(56) References Cited

U.S. PATENT DOCUMENTS

| | | | |
|---|---|---|---|
| 2,380,456 A | 7/1945 | Maier et al. | |
| 4,086,091 A | 4/1978 | Cella | |
| 4,205,018 A * | 5/1980 | Nagasawa et al. | ............ 525/404 |
| 4,544,625 A | 10/1985 | Ishimaru et al. | |
| 4,940,651 A | 7/1990 | Brown et al. | |
| 5,009,224 A | 4/1991 | Cole | |
| 5,011,513 A | 4/1991 | Zador et al. | |
| 5,128,387 A * | 7/1992 | Shustack | ..................... 522/92 |
| 5,128,391 A * | 7/1992 | Shustack | ..................... 522/92 |
| 5,629,365 A * | 5/1997 | Razavi | ........................ 524/37 |
| 5,744,248 A | 4/1998 | Meixner et al. | |
| 5,773,090 A | 6/1998 | Buttner et al. | |
| 6,228,433 B1 | 5/2001 | Witt | |

FOREIGN PATENT DOCUMENTS

| | | |
|---|---|---|
| DE | 198 45 496 A1 | 4/2000 |
| DE | 199 52 323 A1 | 5/2001 |
| DE | 199 57 325 A1 | 5/2001 |
| EP | 0 789 065 A2 | 8/1997 |
| EP | 1 036 829 A1 | 9/2000 |
| EP | 1 277 815 A1 | 1/2003 |
| JP | 04-150976 | 5/1992 |
| JP | 04-264167 | 9/1992 |
| JP | 07-171496 | 7/1995 |
| JP | 2000-063440 | 2/2000 |

OTHER PUBLICATIONS

Patent Abstracts of Japan, vol. 17, No. 52 (C-1022) of JP 04-264167 (1993).
Paints and varnishes—Cross-cut test, ISO 2409, $2^{nd}$ Edition (1992).

* cited by examiner

*Primary Examiner*—William K Cheung
(74) *Attorney, Agent, or Firm*—Woodcock Washburn LLP

(57) ABSTRACT

Process for the production on metal or plastic surfaces of thin, hydrolysis-resistant, scratch-resistant and stain-resistant coatings, wherein the coating material can be applied directly to the cleaned metal surface and subsequently cross-linked by high-energy radiation, in particular UV radiation. The substrates can be coated in the form of strip and only subsequently brought into the required external shape. Coated substrates such as these are no longer susceptible to staining by food, cleaning agents or fingerprints and can also be rendered antibacterial. Objects coated in this manner are thus suitable for use in architecture, for interior fittings of buildings, in furniture-making as well as for ornamental applications, and in particular in households, in sanitary applications, in hospitals and in the food-processing and pharmaceutical industries.

16 Claims, No Drawings

UV-CURING ANTI-FINGERPRINTING COATINGS

This application is a continuation under 35 USC Sections 365(c) and 120 of International Application No. PCT/EP02/09967, filed 6 Sep. 2002 and published 20 Mar. 2003 as WO 03/022945, which claims priority from German Application No. 10144531.8, filed 11 Sep. 2001, each of which is incorporated herein by reference in its entirety.

FIELD OF THE INVENTION

The present invention relates to a process for producing stain-resistant function coatings for metal surfaces, in particular aluminum or high-grade steel surfaces, as well as suitable coating materials for these.

DISCUSSION OF THE RELATED ART

A multitude of appliances, equipment and machines made of metal, in particular high-grade steel or aluminum, are used in households, in sanitary applications, in hospitals as well as in the food-processing and pharmaceutical industries. Here, owing to its high resistance to corrosion, e.g. high-grade steel is preferably used. This is frequently used with a polished or brushed surface and without additional coatings. Furthermore, a multitude of metallic parts having very different compositions are also used in architecture, for interior fittings of buildings, in furniture-making as well as for ornamental applications. In these cases, too, the surface of the metal is frequently polished, brushed or otherwise provided with surface patterns and is used without the application of further coatings.

In this form, the metal surface is highly susceptible to soiling by dust, food or cleaning agents, or marking by fingerprints. A number of methods of treating the surfaces of metals in order to improve the scratch resistance of the surface or to avoid soiling have already been proposed. These involve coating processes using solvent-based and aqueous systems, for example, aqueous electrophoretically precipitable dip coatings, or powder coatings. These coatings are intended to improve the soiling behavior and the scratch resistance of the surface. Disadvantages of the processes are, for example, the curing conditions, such as time, temperature, as well as the consequent plant dimensions. Moreover, it is frequently impossible to form the objects without destroying the surface coating.

DE 199 57 325 and DE 199 52 323 describe coating materials for metals or plastics; there the coating materials are heat-curable and based on aqueous sols consisting of organosilicon compounds. EP 1 036 829 deals with UV-cross-linkable coating materials for metals and conductive plastics, but describes only aqueous systems, which are applied to electrically conducting substrates by means of electrophoretic coating and are subsequently first of all dried at elevated temperature, then post-cured under UV light.

JP-A-07/171,496 and JP-A-04/150976 (1992) describe heat-curable coatings on high-grade steel which are produced from polyester resins and silicate resin or melamine resin. JP 10/228,446 and EP 0 789 065 describe special UV-cross-linking coating systems substantially for coating wood, which are applied in layers of above 20 or 30 μm.

Although, therefore, there exists an extensive prior art concerning UV-cross-linking coating materials, the problem of coating with thin layer thicknesses in order to avoid soiling of metal or even of plastics substrates has not yet been solved. In this connection, the coated surface should have a good stain resistance and be scratch resistant; in addition, the natural appearance in particular of brushed or otherwise structured metal surfaces should be preserved. No observations about these requirements are made in prior art. Furthermore, an energy-saving, rapid and environmentally mild coating process is required, in order to be able to coat even large surfaces economically. A further requirement is that it should be possible to form the coated objects without impairing the coating. The object, therefore, was to provide for these purposes a solvent-free, thin coating system having a high scratch resistance and chemical resistance to alkaline and acidic cleaning agents, such as are used in households and in commerce or in the food-processing industry.

BRIEF SUMMARY OF THE INVENTION

According to the invention, this object is achieved by the provision of a solvent-free liquid coating material which is cross-linked by means of high-energy radiation and, within a temperature range of 0 to 90° C., preferably 15 to 70° C., has a viscosity of less than 1000 mPas, containing
a) 40 to 90 wt. % of at least one oligomeric, linear or branched epoxy (meth)acrylate, polyester (meth)acrylate, polyether (meth)acrylate and/or urethane (meth)acrylate,
b) 5 to 60 wt. %, preferably 10 to 60 wt. %, of at least one monofunctional liquid (meth)acrylate or di-, tri- or poly (meth)acrylate compound, and
c) 0.1 to 20 wt. % of methacrylate compounds containing acidic groups,
d) optionally 0 to 30 wt. % of a di- or trialkoxysilane containing further functional groups,
e) 0.1 to 20 wt. % of auxiliary substances used in coating technology, such as adhesion promoters, flow-control agents, defoaming agents and/or light stabilizers as well as photoinitiators.

The coating material according to the invention is used preferably as coating material for metallic surfaces having thin coatings which are resistant to hydrolysis and to cleaning agents and are scratch resistant. The invention also provides the use of the coating material according to the invention, where the coating material is rendered antibacterial.

The invention also provides a process for coating metallic surfaces, wherein the substrate is optionally first of all cleaned and degreased, the coating material according to the invention is then applied in a layer thickness of 0.5 to 20 μm and finally the coating is cross-linked by means of high-energy radiation. The invention further provides a process for coating those surfaces wherein, prior to the cross-linking step, the coated surface is provided with a removable protective coating film.

DETAILED DESCRIPTION OF CERTAIN EMBODIMENTS OF THE INVENTION

The process according to the invention and the coating material according to the invention are particularly suitable for use on surfaces consisting of ferrous materials, steel and alloyed steel, light metals such as aluminum, magnesium, titanium, non-ferrous metals such as copper, zinc, tin, or precious metals such as gold, silver or alloys thereof. This surface may be ground, brushed, polished, electrochemically treated or electrolytically coated, for example, cadmium-plated, chromium-plated or nickel-plated. Metallized plastics surfaces are also suitable. The substrate may have any shape, but is preferably in the form of sheets, strips or rolls.

The coating materials according to the invention contain polymerizable oligomers containing unsaturated double bonds such as, for example, polyester oligomers or polyether oligomers having lateral or terminal (meth)acrylic groups, or preferably (meth)acrylate functional aliphatic, cycloaliphatic and/or aromatic epoxide compounds or polyurethane oligomers having reactive (meth)acrylate groups. These oligomers are to have at least two functional unsaturated double bonds and in general have a molecular weight of between 500 and 15000. They are obtainable commercially. The quantity is 40 to 90 wt. %, in particular 45 to 85 wt. %, and mixtures of different oligomers are also possible.

The coating material is also to contain at least one mono-, di-, tri- or polyfunctional unsaturated low-molecular (meth)acrylate, with separate compounds or mixtures possibly being present. Examples of such compounds are: optionally alkoxylated alkanediol (meth)acrylates or alkanetriol (meth)acrylates, such as 1,3-butylene glycol di(meth)acrylate, 1,4-butanediol di(meth)acrylate, 1,6-hexanediol di(meth)acrylate, trialkylene glycol di(meth)acrylate, polyalkylene glycol di(meth)acrylate, tetraalkylene glycol di(meth)acrylate, neopentyl, glycol di(meth)acrylate, glycerol alkoxytri(meth)acrylate, alkoxylated neopentyl glycol di(meth)acrylate; (meth)acrylic epoxide compounds, such as bisphenol A epoxide di(meth)acrylate; polyhydroxy (meth)acrylates, such as pentaerythritol tri(meth)acrylate, trimethylolpropane tri(meth)acrylate, trisalkoxytrimethylolpropane tri(meth)acrylate, di-trimethylolpropane tetra(meth)acrylate, pentaerythritol tetra(meth)acrylate, tris(2-hydroxyalkyl)isocyanurate tri(meth)acrylate, dipentaerythritol tetra(meth)acrylate, dipentaerythritol penta(meth)acrylate, dipentaerythritol hexa(meth)acrylate, with alkylene denoting ethylene, propylene or butylene and alkoxy denoting ethoxy, 1,2- or 1,3-propoxy or 1,4-butoxy.

The following (meth)acrylates are examples of monofunctional acrylate compounds which can be used: linear, branched or cyclic alkyl(meth)acrylates, such as n-/isoalkyl (meth)acrylate, cyclohexyl(meth)acrylate, 4-tert.-butyl cyclohexyl(meth)acrylate, dihydrocyclopentadienyl(meth)acrylate, tetrahydrofurfuryl (meth)acrylate, isobornyl(meth)acrylate, allyl (meth)acrylate, mono(meth)acryloyl alkyl phthalate, succinate or maleate; alkanediol mono(meth)acrylates, such as hydroxypropyl(meth)acrylate, polyalkylene glycol (meth)acrylate, monoalkoxytrialkylene glycol (meth)acrylate, 2,3-epoxypropyl(meth)acrylate; aromatic (meth)acrylates, such as nonylphenol (meth)acrylate, 2-phenoxyalkyl(meth)acrylate; acrylamides, such as N,N-dialkyl(meth)acrylamide, N,N-dialkylaminoalkyl (meth)acrylamide. A proportion of vinyl ethers may also be used, for example, vinyl ethyl ether, vinyl propyl ether, vinyl isobutyl ether, vinyl dodecyl ether, butanediol-1,4-divinyl ether, diethylene glycol divinyl ether, hydroxybutyl vinyl ether. The monomeric acrylate compounds may be present separately or as a mixture, the total quantity amounting to between 5 and 60 wt. %, in particular between 15 and 50 wt. %.

The coating materials may also contain di- or trialkoxysilanes having additional organofunctional groups. Examples of these are aminopropyltrialkoxysilane, bis(trialkoxysilylpropyl)amine, hydroxyethyl-trialkoxysilane, carboxypropyl-trialkoxysilane, vinyltrialkoxysilane, with alkoxy in each case denoting methoxy, ethoxy, propoxy or butoxy. The quantity is to be preferably between 0 and 15 wt. %.

Preferably, the coating materials are to contain methacrylate compounds which have acidic groups and contain one, two or more (meth)acrylic groups and in addition acidic functional groups. The quantity of this component is to be between 0.1 and 20 wt. %, preferably between 0.5 and 10 wt. %. Examples of such acidic functional groups are carboxyl groups, phosphoric or phosphonic groups, sulfo groups and derivatives thereof, for example, esters. Phosphoric groups are particularly preferred.

The known, preferably radical, initiators can be used as photoinitiators, such as, for example, 2-benzyldimethylamino-1-(4-morpholinophenyl)butanone-1, benzil dimethylketal or dimethoxyphenylacetophenone, α-hydroxybenzyl phenyl ketone, 1-hydroxy-1-methylethyl phenyl ketone, oligo-2-hydroxy-2-methyl-1-(4-(1-methylvinyl)phenyl)propanone, benzophenone, methylorthobenzoyl benzoate, methyl benzoyl formate, 2,2-diethoxyacetophenone, 2,2-di-sec.-butoxyacetophenone, p-phenylbenzophenone, 2-isopropylthioxanthone, 2-methylanthraquinone, 2-ethylanthraquinone, 2-chloroanthraquinone, 1,2-benzanthraquinone, benzil, benzoin, benzoin methyl ether, benzoin isopropyl ether, α-phenylbenzoin, thioxanthone, diethylthioxanthone, 1,5-acetonaphthalene, 1-hydroxycyclohexyl phenyl ketone, ethyl p-dimethylaminobenzoate. These may be used separately or as a mixture or combined with other radical initiators of the peroxide type or with amine accelerators.

Besides the above-mentioned binders, the coating material according to the invention contains small quantities of other additives which have a beneficial influence on, for example, the flow properties, film formation, adhesion or resistance of the coating material. Examples of these are flow-control agents, such as fluorinated polysilicone glycols, silicone glycols, polyether polysiloxane copolymers. The known agents based on sterically hindered amino compounds can be used as light stabilizers.

The coating material may also contain dyes, optical brighteners and/or pigments as additives. Dyes are those based on organic dyes, which are soluble in the coating material. These form colored transparent coatings after the film has cured, and together with the substrate surface can produce special visual effects. Optical brighteners are compounds of the type which absorb UV radiation and reradiate it in visible light; they may, for example, be selected from among the triazine derivatives. By pigments are meant organic or inorganic, colored or uncolored pigment preparations, such as iron oxide pigments, titanium dioxide pigments, carbon black, quinacridone or phthalocyanine pigments. These have to be homogeneously distributed in the coating material. In this connection, the particle size has to be appreciably less than the intended layer thickness, preferably less than 1 μm. It may be advantageous to disperse these components in portions of the liquid acrylate compounds prior to addition to the coating material.

Micronised fillers such as, for example, silica, aluminum oxide, titanium dioxide or barium sulfate, may also be used. These are white, colorless or opaque/transparent and are used in finely dispersed form. Depending on quantity and type, they can influence the surface hardness, structure and scratch resistance of the coating. The quantity of auxiliary substances is to be between 0.1 and 20 wt. %, preferably 0.5 to 15 wt. %.

Moreover, in a preferred embodiment the coating material may contain antibacterial or biocidal compounds. These are, for example, organic substances, such as bioguanidines, substituted benzalkonium halides, alkyl polyvinylpyridines, betaine, or inorganic compounds, such as silver salts or finely divided silver particles within the particle-size range of a few nm. The quantity is to be 0.1 to 5 wt. % and depends on the activity of the substance used. These compounds are incorporated into the coating material and are not destroyed during the cross-linking reaction. They result in surfaces having long-term antibacterial action.

The components of the coating material according to the invention can be mixed together by means of known methods.

Here, it may be useful to dissolve or, for example, in the case of pigments, to disperse solid components in components of low viscosity. To ensure stability in storage, in the case of particularly reactive components it may be beneficial to pre-mix these in components of low viscosity prior to addition to the coating material and limit a possible reaction.

The process according to the invention can be adapted for the objects to be coated in the process. Depending on the condition of its processing, the substrate is subjected to a cleaning step, which can be carried out by dipping, spraying, high-pressure or injection spraying or with the assistance of ultrasound or electrolysis. In the course of this, dust particles, oxide layers, adhering residues or fatty/oily substances are removed from the production process. The known, preferably aqueous, cleaning agents can be used for the cleaning process. After the cleaning process, the surface is rinsed with water, dried and then immediately further processed. Preferably, no further pretreatment is carried out prior to the coating with the coating material according to the invention; in particular, no primer is applied.

The substrate can be covered with the coating material by means of the known methods of application. If formed or profiled parts are to be coated, mainly the spraying systems commonly used in coating technology, such as, for example, airless, air-assisted or electrostatically assisted spraying processes, are suitable, or even manual application by brush. Particularly preferably, the coating material is applied to a level surface of a workpiece or of a metal strip by flooding/squeezing off, spraying/squeezing off, or by suitable squeegee or roller applications. Here, the viscosity of the coating material during the application is to be below 1000 mPas, preferably below 300 mPas (measured in a cone/plate viscometer).

The layer thickness of the coating material is generally 0.5 to 20 µm, in particular 1 to 10 µm, particularly preferably up to 5 µm.

The coating material is generally applied at temperatures of between 0° C. and 90° C., preferably 15° C. and 70° C. The coating is then cross-linked by high-energy radiation such as, for example, UV radiation, electron radiation or γ-radiation. The electron radiation should have energy values of between 150 and 350 keV. Preferably, cross-linking is effected by UV radiation, in particular having a wavelength of 150 to 800 nm, particularly preferably of between 200 and 450 nm. Suitable radiation sources are known to the person skilled in the art. The intensity of radiation and the duration of the radiation depend on the processing conditions, for example, distance of the radiation source or relative movement between source and substrate. The duration, however, is generally below 60 seconds, preferably between 0.001 and 30 seconds. The respective variables for the equipment can be determined by the person skilled in the art by simple adjustment.

In a particular embodiment of the process, the oxygen content may be decreased in the zone above the substrate to be cross-linked. Here, it is to be in particular below 3000 ppm, preferably below 1000 ppm. This can be effected, for example, by partial or complete exchange of the ambient air present in the cross-linking zone for inert gases, for example, argon, nitrogen, $CO_2$ or mixtures of these. An advantage of this embodiment of the process is that the required concentration of photoinitiator in the coating material can be decreased.

Another embodiment of the invention includes the additional step wherein, after the application of the coating material, a film which is permeable to the high-energy radiation used is first of all applied to the substrate. It is possible to apply such a film to three-dimensional substrates, but it is preferred that the substrate be a sheet or strip. The application is carried out preferably by a mechanical method; for example, the tear-resistant film can be withdrawn from a delivery roll and applied, free from voids, to the substrate surface by means of a roller. After this processing step, the coating material under the film is cross-linked by radiation. An advantage of this process is that the curing takes place underneath the film under inert conditions, i.e. in particular with the exclusion of oxygen.

The film consists, for example, of polyethylene, polypropylene, PET or mixtures of these. It is colored or, preferably, transparent. The film must not react with the coating material. It is tear-resistant, so that in a subsequent processing step it can be removed from the substrate surface by drawing off. This can also be done at the premises of the end-user, so that the film can serve as protection for the object during further processing and/or transport.

The use of the coating material according to the invention results in coated substrates, in particular of the metallic type, having a thin surface coating. At the same time, special visual effects can be achieved such as, for example, metallic lustre, dulling, structures or colorations. Preferred uses of the objects coated according to the invention are metal sheets, metal parts or profiled metals used in architecture, for interior fittings of buildings or in furniture-making, as well as metallic ornaments. In particular, the metallic workpieces coated according to the invention can be used in the manufacture of machines, articles or equipment for households, sanitary applications, hospitals as well as for the food-processing or pharmaceutical industries. For the last-named fields, mainly high-grade steel is used.

The coatings according to the invention exhibit good stability and resistance to soiling by a multitude of agents of the type found, for example, in households or in the food industry, such as black tea, black ink, condensed milk, fruit juices, vinegar, mustard, ketchup, mayonnaise, onions, sugar and caramel. The fingerprints which are left on uncoated metal surfaces do not leave any permanent traces on metal coated according to the invention, and can be easily removed. In particular, at temperatures of up to 60° C. the coatings are also resistant to acidic and alkaline cleaning agents such as, for example, rinsing agents, so-called "steel gloss" or all-purpose cleaning agents. At the same time, the visual appearance of the surface is completely preserved.

The invention is explained in more detail by means of the following Examples, but the selection of the Examples does not constitute a limitation to the scope of the invention. Unless otherwise specified, all quantitative data in the following Examples are percent by weight or parts by weight, based on the total composition.

EXAMPLES

In the following coatings according to the present invention, brushed sheets of high-grade steel were used for Examples 1 to 9. Prior to being coated, all substrates were degreased by means of an aqueous, slightly alkaline cleaning agent and then dried. The components of the coating material according to the invention were homogenised by intensive mixing in high-speed stirrers. The coating material was applied in a layer weight of <5 g/m² by means of a roll coater or coating knife and cured in a standard atmosphere by means of UV radiation (emitter type: Fusion VPS/1 600, H-emitter, 240 W/cm, 100% performance) in a UV unit with a conveyor belt speed of 20 m/min.

The individual Examples and results are shown in Tables 1 and 2 below (quantities in parts by weight)

TABLE 1

| Example/Raw Material | | 1 | 2 | 3 | 4 | 5 | 6 | 7 | 8 | 9 |
|---|---|---|---|---|---|---|---|---|---|---|
| 1 | Aliphatic epoxy acrylate | 61.9 | — | — | — | — | — | — | — | — |
| 2 | Aliphatic hexa-functional urethane acrylate Mw 1000 | — | 56.9 | 56.9 | 56.9 | — | 34.0 | 56.9 | 31.5 | 31.6 |
| 3 | Aromatic epoxy diacrylate Mw 460 | — | — | — | — | 80.8 | 37.0 | — | 34.3 | 34.5 |
| 4 | Isobornyl acrylate | 30.6 | 35.1 | 35.1 | 35.1 | — | 21.1 | 35.1 | 19.4 | 19.5 |
| 5 | Neopentyl glycol propoxylate diacrylate | 20.0 | 20.0 | — | — | 10.0 | 2.1 | — | 2.0 | 2.0 |
| 6 | Vinyltrimethoxy-silane | — | — | 5.0 | 15.0 | — | — | 5.0 | — | — |
| 7 | Bis(gamma-trimethoxysilylpropyl)amine | 10.0 | 10.0 | — | — | 4.2 | 1.0 | — | 0.9 | 0.8 |
| 8 | Acid triacrylate (acid value 150) | 2.5 | 3.0 | 3.0 | 3.0 | — | 1.8 | 3.0 | 1.7 | 1.7 |
| 9 | Phosphoric acid acrylate (acid value 300) | | — | — | — | 3.0 | — | — | 2.8 | 2.8 |
| 10 | Photoinitiator | 5.0 | 5.0 | 5.0 | 5.0 | 5.0 | 3.0 | 4.5 | 4.6 | 4.7 |
| 11 | Commercial biocide | — | — | — | — | — | — | 0.5 | — | — |
| 12 | Hydrophobic silica | — | — | — | — | — | — | — | 2.8 | — |
| 13 | Nanoparticulate $Al_2O_3$ | | | | | | | | | 2.4 |

Photoinitiator is in the form of a 1.5:1 mixture of 1-hydroxy-1-methylethyl phenyl ketone and 1-hydroxycyclohexyl phenyl ketone.

Methods of Measurement:

1. Fingerprint: a fingerprint was made on the coated metal sheet and assessed visually. It was optionally wiped off with a soft, dry cloth.

2. Cross cut in accordance with DIN 53151: cross cuts were made using a cross-hatch cutter (Erichsen Model 295) and glued over with an adhesive tape, which was then torn off and the cuts assessed. The gluing and tearing off were again carried out similarly after the cut had been exposed to steam. The cross cut test results are reported on a scale of from 0 (no additional damage except the cuts) to 5 (large sections of the coating removed from the surface).

3. Soiling: a 5 cm² area of the surface of the coated metal sheet was covered with the test agents (black tea, lemon juice, mustard, ketchup, mayonnaise) and stored for 1 hour at 60° C. The metal sheet was then rinsed with water and dried with a soft cloth.

4. Solvent resistance: a few drops of solvent were applied to the coated metal sheet and, after about 5 seconds, removed with a soft cloth. The swelling and dissolving behavior of the coating were assessed.

5. Steam test: The metal sheet bent by 900 was positioned at a small distance above a vessel filled with boiling water and there exposed to steam for 2 hours.

The results of the examinations of the surface quality and of the resistance of the coatings according to the invention are summarized in Table 2 below. The surface qualities and the scratch resistance are good; the sensitivity to fingerprints is likewise good in all the coatings according to the invention.

In the following tables, a "+" signifies that a positive or favorable result was obtained while "0" means that an intermediate (medium) result was obtained. A negative or unfavorable result (none of which were obtained in the testing reported herein) would be signified by a "−" sign.

| | Surface quality | | | Resistance to | | | |
|---|---|---|---|---|---|---|---|
| | | | | Foods[3] | Mild cleaning agents[3] | Strong cleaning agents[7] | |
| Example | Finger-Prints[1] | Scratch Resistance[6] | Crosscut[2] | | | | Solvent[4] | Steam[5] |
| 1 | + | + | 0(0) | 0 | 0 | + | not determined | + |
| 2 | 0 | + | 0(0) | + | + | + | not determined | + |
| 3 | + | + | 0(0) | + | + | + | not determined | 0 |
| 4 | + | + | 0(0) | + | + | 0 | + | 0 |
| 5 | + | + | 0(0) | + | + | + | + | + |
| 6 | + | + | 0(1) | + | + | + | + | + |
| 7 | + | + | 0(0) | + | + | + | + | 0 |

-continued

| | Surface quality | | | Resistance to | | | | |
|---|---|---|---|---|---|---|---|---|
| | | | | | Mild | Strong | | |
| Example | Finger-Prints[1] | Scratch Resistance[6] | Crosscut[2] | Foods[3] | cleaning agents[3] | cleaning agents[7] | Solvent[4] | Steam[5] |
| 8 | + | + | 0(0) | + | + | + | + | + |
| 9 | + | + | 0(0) | + | + | + | + | + |

[1]Visual assessment of fingerprints
[2]Marking in accordance with DIN 53151; results after exposure to steam are shown in brackets.
[3]Foods: mustard, tea, mayonnaise, ketchup, lemon juice, et cetera; mild cleaning agents: all-purpose cleaning agents, rinsing agents, et cetera.
[4]The tests were carried out using acetone, naphtha and ethanol.
[5]Sample metal sheets bent by 90° were treated with steam for 2 h and assessed visually.
[6]Determined using a hardness test rod 318, Erichsen
[7]Cleaning agents: oven cleaner, Ceran cleaner etc.

Examples 10-12

Additional substrates were coated and tested using the coating material from Example 9:

| Example | Substrate (brushed) | Layer thickness | Appearance | Cleaning agent | Finger-print |
|---|---|---|---|---|---|
| 10 | brass (MS 39) | 5 μm | in order | + | + |
| 11 | AlMg1 | 5 μm | in order | + | + |
| 12 | copper | 5 μm | in order | 0 | + |

What is claimed is:

1. A coating material comprising components:
   a. 40 to 90 wt. % of at least one oligomeric substance selected from the group consisting of epoxy (meth)acrylates, polyester (meth)acrylates, polyether (meth)acrylates, and polyurethane (meth)acrylates, wherein said oligomeric substance is linear or branched and contains at least two unsaturated double bonds;
   b. 5 to 60 wt. % of at least one low molecular weight (meth)acrylate selected from the group consisting of monofunctional, difunctional, trifunctional and polyfunctional (meth)acrylate compounds;
   c. 0.1 to 20 wt. % of at least one (meth)acrylate compound different from a and b containing one or more acidic groups; and
   d. 0.1 to 20 wt. % of at least one auxiliary substance selected from the group consisting of adhesion promoters different from c, flow-control agents, defoaming agents, light stabilizers, dyes, pigments, biocides, fillers and photoinitiators;
   wherein 2.0 to 9.7 wt. %, based upon total coating material, of the at least one low molecular weight (meth)acrylate is selected from difunctional, trifunctional and polyfunctional (meth)acrylate compounds; and
   wherein at least one of nanoparticulate aluminum oxide or hydrophobic silica is present in highly dispersed form in the coating material and said components are selected such that the coating material has a viscosity of less than 1000 mPas within a temperature range of 0 to 90° C.

2. A coating material according to claim 1 wherein a, b, c, and d are selected and homogenized together such that the coating material has a viscosity within a temperature range of 15° C. to 70° C. of less than 300 mPas.

3. A coating material according to claim 1 additionally comprising up to 20 wt. % of at least one silane selected from the group consisting of dialkoxysilanes and trialkoxysilanes wherein said at least one silane contains at least one functional group other than alkoxy groups.

4. A coating material according to claim 1, wherein component c) comprises at least one methacrylate compound selected from the group consisting of phosphoric (meth)acrylate compounds and phosphonic (meth)acrylate compounds.

5. A coating material according to claim 1 comprising at least one dye or pigment.

6. A coating material according to claim 1 comprising at least one biocide.

7. A coating material comprising:
   a. 45 to 85 wt. % of at least one oligomeric substance having at least two unsaturated double bonds selected from the group consisting of epoxy (meth)acrylates, polyester (meth)acrylates, polyether (meth)acrylates, and polyurethane (meth)acrylates, wherein said oligomeric substance is linear or branched;
   b. 10 to 60 wt. % of at least one (meth)acrylate selected from the group consisting of monofunctional, difunctional, trifunctional and polyfunctional (meth)acrylate compounds;
   c. 0.5 to 10 wt. % of at least one (meth)acrylate compound containing one or more phosphoric or carboxyl acidic functional groups;
   d. 0.5 to 15 wt. % of at least one radical photoinitiator; and
   e. up to 20 wt. % of at least one silane selected from the group consisting of dialkoxysilanes and trialkoxysilanes wherein said at least one silane contains at least one functional group other than alkoxy groups;
   wherein at least one of nanoparticulate aluminum oxide or hydrophobic silica is present in highly dispersed form in the coating material and a.-e. are selected such that the coating material has a viscosity of less than 1000 mPas within a temperature range of 0 to 90° C.

8. A coating material according to claim 7, wherein component c) comprises at least one methacrylate compound selected from the group consisting of phosphoric (meth)acrylate compounds and phosphonic (meth)acrylate compounds.

9. A coating material according to claim 7 additionally comprising up to 20 wt. % of at least one silane selected from the group consisting of dialkoxysilanes and trialkoxysilanes wherein said at least one silane contains at least one functional group other than alkoxy groups.

10. A coating material according to claim 7 comprising at least one antibacterial or biocidal component.

11. A high-energy radiation curable coating material for metal surfaces comprising:

a. 40 to 90 wt. % of a component of at least one oligomeric substance selected from aromatic epoxy (meth)acrylates, said at least one oligomeric substance optionally including at least one of polyester (meth)acrylates, polyether (meth)acrylates, and polyurethane (meth)acrylates, wherein said oligomeric substance contains at least two unsaturated double bonds;

b. 5 to 60 wt. % of a component of at least one low molecular weight (meth)acrylate selected from the group consisting of monofunctional, difunctional, trifunctional and polyfunctional (meth)acrylate compounds different from a;

c. 0.1 to 20 wt. % of a component of at least one (meth)acrylate compound different from a and b containing one or more acidic groups; and d. 0.1 to 20 wt. % of a component of at least one auxiliary substance selected from the group consisting of adhesion promoters, flow-control agents, defoaming agents, light stabilizers, dyes, pigments, biocides, fillers and photoinitiators;

wherein at least one of nanoparticulate aluminum oxide or hydrophobic silica is present in highly dispersed form in the coating material; and wherein said components are selected and homogenized such that the coating material has a viscosity of less than 1000 mPas within a temperature range of 0 to 90° C. and the coating material deposited on metal surfaces crosslinks to become a formable surface coating upon curing.

12. A coating material according to claim 11, wherein component a) comprises 34.3 to 80.8 wt. %, based on total coating material, of aromatic epoxy (meth)acrylates.

13. A coating material according to claim 11, wherein component b) comprises 2.0 to 9.7 wt. %, based upon total coating material, of difunctional, trifunctional and polyfunctional (meth)acrylate compounds.

14. A coating material comprising:

a. 40 to 90 wt. % of at least one oligomeric substance selected from the group consisting of epoxy (meth)acrylates, polyester (meth)acrylates, polyether (meth)acrylates, and polyurethane (meth)acrylates, wherein said oligomeric substance is linear or branched and contains at least two unsaturated double bonds;

b. 5 to 60 wt. % of at least one low molecular weight (meth)acrylate selected from the group consisting of monofunctional, difunctional, trifunctional and polyfunctional (meth)acrylate compounds;

c. 0.1 to 20 wt. % of at least one (meth)acrylate compound different from a and b containing one or more acidic groups and comprising at least one methacrylate compound selected from the group consisting of phosphoric (meth)acrylate compounds and phosphonic (meth)acrylate compounds; and d. 0.1 to 20 wt. % of at least one auxiliary substance selected from the group consisting of adhesion promoters different from c, flow-control agents, defoaming agents, light stabilizers, dyes, pigments, biocides, fillers and photoinitiators;

wherein 2.0 to 15.4 wt. %, based upon total coating material, of the at least one low molecular weight (meth)acrylate is selected from difunctional, trifunctional and polyfunctional (meth)acrylate compounds; and wherein at least one of nanoparticulate aluminum oxide or hydrophobic silica is present in highly dispersed form in the coating material and a.-d. are selected such that the coating material has a viscosity of less than 1000 mPas within a temperature range of 0 to 90° C.

15. A coating material according to claim 7, comprising:
aromatic epoxy (meth)acrylate as component a.; and
neopentyl glycol (meth)acrylate, optionally alkoxylated, as component b.

16. A coating material according to claim 7, comprising:
aromatic epoxy (meth)acrylate and aliphatic hexafunctional urethane (meth)acrylate as component a.; and
Isobornyl (meth)acrylate and neopentyl glycol (meth)acrylate, optionally alkoxylated, as component b.

* * * * *